(12) United States Patent
Hohmann, Jr.

(10) Patent No.: US 10,480,197 B2
(45) Date of Patent: Nov. 19, 2019

(54) MASONRY SUPPORT

(71) Applicant: Columbia Insurance Company, Omaha, NE (US)

(72) Inventor: Ronald P. Hohmann, Jr., Hauppauge, NY (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 15/478,915

(22) Filed: Apr. 4, 2017

(65) Prior Publication Data

US 2018/0283012 A1    Oct. 4, 2018

(51) Int. Cl.
| | |
|---|---|
| *E04B 1/41* | (2006.01) |
| *E04B 1/38* | (2006.01) |
| *E04F 13/08* | (2006.01) |
| *E04F 13/14* | (2006.01) |
| *E04B 1/76* | (2006.01) |

(52) U.S. Cl.
CPC ............ *E04F 13/081* (2013.01); *E04F 13/14* (2013.01); *E04B 1/762* (2013.01); *E04B 1/7654* (2013.01)

(58) Field of Classification Search
CPC .......... E04B 1/762; E04B 1/7654; E04B 1/38; E04B 1/4107; E04B 1/4178; E04B 1/4185; E04B 2/88; E04B 2/90; E04B 2/92; E04B 2/96; E04B 2/965; E04B 2/967; E04B 13/0803; E04F 13/081; E04F 13/14; E04F 13/0807; E04F 13/0808; E04F 13/0862; E04F 13/0864
USPC ........................................ 52/434
See application file for complete search history.

(56) References Cited

U.S. PATENT DOCUMENTS

| | | | |
|---|---|---|---|
| 1,158,307 | A | 10/1915 | Schmidt |
| 1,412,477 | A | 4/1922 | McIvor |
| 1,498,526 | A | 6/1924 | O'Sullivan |

(Continued)

FOREIGN PATENT DOCUMENTS

| | | |
|---|---|---|
| CA | 2426567 A1 | 8/2004 |
| CA | 2950712 A1 | 6/2018 |

(Continued)

OTHER PUBLICATIONS

Hagel, M. D., et al., "Monumental Masonry Arches," Construction Canada, pp. Fig. 10b, accessed from <https://www.constructioncanada.net/monumental-masonry-arches/>, dated Oct. 21, 2014.

(Continued)

*Primary Examiner* — Joshua J Michener
*Assistant Examiner* — James Buckle, Jr.
(74) *Attorney, Agent, or Firm* — Stinson LLP

(57) ABSTRACT

A facade support system can be attached to a wall of a structure to support a veneer on the wall. A bracket of the support system that can be attached to the wall includes a connecting plate and a mounting member. A support attached to the connecting plate can be disposed in a mortar bed joint of the veneer. A standoff positioned for engagement with the wall is selectively attachable to the connecting plate in different locations for maintaining a substantially horizontal position of the support. In some instances the mounting member may have detents engageable with detents on a washer. In other instances both the connecting plate and the mounting member include detents.

21 Claims, 15 Drawing Sheets

(56) References Cited

U.S. PATENT DOCUMENTS

| | | | |
|---|---|---|---|
| 1,634,674 A | 7/1927 | Mattice | |
| 1,638,892 A | 8/1927 | Stresau | |
| 1,696,764 A | 12/1928 | Herrick | |
| 1,715,694 A | 6/1929 | Coddington | |
| 1,761,306 A | 6/1930 | McKeown | |
| 1,770,932 A | 7/1930 | Leake | |
| 1,773,068 A | 8/1930 | Vienneau | |
| 1,806,508 A | 5/1931 | Smith | |
| 1,954,357 A | 4/1934 | Leake | |
| 1,989,834 A | 2/1935 | Watson | |
| 2,013,820 A | 9/1935 | Wilson | |
| 2,042,463 A | 6/1936 | Henderson | |
| 2,108,373 A | 2/1938 | Greulich | |
| RE21,921 E | 10/1941 | Greulich | |
| 2,363,917 A | 11/1944 | Waterman et al. | |
| 2,736,397 A | 2/1956 | Colby, Jr. | |
| 2,997,141 A | 8/1961 | Wetzler | |
| 3,234,702 A * | 2/1966 | Zibell | E04B 1/5806 52/379 |
| 3,321,880 A * | 5/1967 | Ferrell | E04B 2/96 52/235 |
| 3,374,497 A | 3/1968 | Meheen | |
| 3,572,002 A | 3/1971 | Nichols | |
| 3,605,360 A | 9/1971 | Lindal | |
| 3,968,604 A | 7/1976 | Hills | |
| 4,013,253 A | 3/1977 | Perrault et al. | |
| 4,020,612 A | 5/1977 | Welch | |
| 4,129,974 A | 12/1978 | Ojalvo | |
| 4,247,980 A | 2/1981 | Tominoi | |
| 4,333,218 A | 6/1982 | Wentworth | |
| 4,827,684 A * | 5/1989 | Allan | E04B 1/4178 52/378 |
| 4,894,962 A | 1/1990 | Conn | |
| 5,081,807 A | 1/1992 | Murdza | |
| 5,218,801 A | 6/1993 | Hereford | |
| 5,227,360 A | 7/1993 | Sherba et al. | |
| 5,233,799 A | 8/1993 | Abukawa | |
| 5,245,802 A | 9/1993 | Davis | |
| 5,417,050 A * | 5/1995 | Cosentino | B28D 1/18 52/235 |
| 5,422,830 A | 6/1995 | Post | |
| 5,505,365 A | 4/1996 | Olsen | |
| 5,619,834 A * | 4/1997 | Chen | E04F 13/0855 52/126.1 |
| 5,749,199 A | 5/1998 | Allen | |
| 5,809,735 A | 9/1998 | Leblanc | |
| 5,816,008 A * | 10/1998 | Hohmann | E04B 1/4178 52/565 |
| 5,893,254 A | 4/1999 | Troiani et al. | |
| 6,047,516 A | 4/2000 | Taylor | |
| 6,055,788 A | 5/2000 | Martin et al. | |
| 6,082,075 A | 7/2000 | Rysgaard | |
| 6,128,883 A * | 10/2000 | Hatzinikolas | E04B 1/4178 52/378 |
| 6,560,938 B1 | 5/2003 | Powers, Jr. | |
| 6,691,487 B2 | 2/2004 | Daudet | |
| 6,854,219 B1 | 2/2005 | Kelly et al. | |
| 7,043,884 B2 * | 5/2006 | Moreno | E04F 13/0808 52/235 |
| 7,162,842 B2 * | 1/2007 | Ribic | E04B 2/96 52/167.3 |
| 7,908,804 B2 * | 3/2011 | Vieira | E04C 3/02 52/204.2 |
| 8,039,115 B2 | 10/2011 | Hackius et al. | |
| 8,074,958 B1 | 12/2011 | Hoy | |
| 8,201,374 B2 * | 6/2012 | Hohmann, Jr. | E04B 1/4178 52/379 |
| 8,240,099 B2 * | 8/2012 | Hummel, III | E04F 13/0892 52/235 |
| 8,365,481 B2 * | 2/2013 | Scully | E04F 13/0805 52/235 |
| 8,511,032 B2 * | 8/2013 | Abdel-Rahman | E04B 2/88 248/228.1 |
| 8,561,373 B1 | 10/2013 | McDonald | |
| 8,613,173 B2 * | 12/2013 | Ander | E04B 2/90 52/235 |
| 8,621,802 B2 * | 1/2014 | Spyrou | E04B 1/003 248/216.1 |
| 8,833,025 B2 * | 9/2014 | Krause | E04F 13/0828 52/235 |
| 8,863,460 B2 * | 10/2014 | Hohmann, Jr. | E04B 1/4178 52/379 |
| 8,904,730 B2 * | 12/2014 | Hohmann, Jr. | E04B 1/4178 52/379 |
| 9,121,169 B2 * | 9/2015 | Hohmann, Jr. | E04B 1/7637 |
| 9,316,004 B1 * | 4/2016 | Hatzinikolas | F16M 13/02 |
| 9,447,585 B2 * | 9/2016 | Hatzinikolas | E04B 1/40 |
| 9,469,999 B1 * | 10/2016 | Aboukhalil | E04F 13/0816 |
| 9,499,974 B2 * | 11/2016 | Bombino | E04B 1/7612 |
| 9,683,367 B1 * | 6/2017 | Ting | E04B 2/965 |
| 9,856,655 B2 * | 1/2018 | Knight | E04F 13/0864 |
| 9,896,840 B2 * | 2/2018 | Ting | E04B 2/965 |
| 10,006,202 B2 | 6/2018 | Kimura et al. | |
| 2001/0004815 A1 | 6/2001 | LePoire | |
| 2002/0108325 A1 | 8/2002 | Hulls et al. | |
| 2003/0033764 A1 * | 2/2003 | Ting | E04B 2/96 52/235 |
| 2003/0150179 A1 * | 8/2003 | Moreno | E04F 13/0808 52/235 |
| 2004/0050013 A1 | 3/2004 | Okada et al. | |
| 2005/0204658 A1 | 9/2005 | Patterson | |
| 2006/0150571 A1 | 7/2006 | Zahner, III | |
| 2006/0179738 A1 | 8/2006 | Perrino et al. | |
| 2007/0039258 A1 * | 2/2007 | Walker, III | E04B 2/96 52/235 |
| 2009/0183448 A1 | 7/2009 | Kennelly | |
| 2009/0315346 A1 | 12/2009 | Schelberg et al. | |
| 2010/0086348 A1 | 4/2010 | Funahashi et al. | |
| 2011/0061337 A1 | 3/2011 | O'Shea et al. | |
| 2011/0175380 A1 | 7/2011 | Kamiya | |
| 2012/0246937 A1 | 10/2012 | Barrett et al. | |
| 2014/0134394 A1 | 5/2014 | Noble et al. | |
| 2014/0208681 A1 * | 7/2014 | Rice | E04B 1/4178 52/712 |
| 2014/0245674 A1 | 9/2014 | Harrison et al. | |
| 2016/0002910 A1 | 1/2016 | Green | |
| 2016/0006227 A1 | 1/2016 | Tally et al. | |
| 2016/0145875 A1 * | 5/2016 | Scully | E04F 13/0807 52/698 |
| 2017/0234012 A1 | 8/2017 | Kimura et al. | |
| 2017/0362812 A1 | 12/2017 | Garry | |
| 2018/0155929 A1 | 6/2018 | Hohmann, Jr. et al. | |

FOREIGN PATENT DOCUMENTS

| | | |
|---|---|---|
| CN | 202090293 | 12/2011 |
| DE | 862247 | 7/1949 |
| DE | 7714716 U1 | 9/1977 |
| DE | 10117199 A1 | 4/2001 |
| EP | 1353021 B1 | 12/2002 |
| EP | 1375777 A1 | 6/2003 |
| EP | 397622 A1 | 3/2011 |
| GB | 381789 | 10/1932 |
| GB | 2028903 A | 3/1980 |
| GB | 2172314 A | 9/1986 |
| GB | 2263918 A | 1/1992 |
| GB | 2288831 A | 4/1995 |
| GB | 2375552 A | 4/2002 |
| GB | 2485153 | 5/2012 |
| GB | 250980 A | 4/2013 |
| IE | 20130144 A1 | 11/2013 |
| JP | 56105837 A | 8/1981 |
| JP | 60-148685 A | 8/1985 |
| JP | 62-114734 A | 5/1987 |
| JP | 05-57305 A | 3/1993 |
| JP | H07-116684 B2 | 12/1995 |
| JP | 2006-231338 A | 9/2006 |
| JP | 5954942 A | 7/2016 |
| JP | 2017166123 | 9/2017 |
| JP | 2018-53593 A | 4/2018 |
| KR | 555244 | 3/2006 |

(56) References Cited

FOREIGN PATENT DOCUMENTS

| WO | 9214007 | 8/1992 |
| WO | 2007/078272 A2 | 7/2007 |
| WO | 2017072389 A1 | 5/2017 |

OTHER PUBLICATIONS

Information Sheet for FAST Fero Angle Support Technology, www.ferocorp.com, 4 pgs.
IG Support, Masonry Support & Windpost Systems Catalog, www.iglintels.com, 36 pgs.
AnconOptima Masonry Support website, Ancon, A CRH Company, https://www.ancon.co.uk.
Ancon MDC Masonry Support website, Ancon, A CRH Company, https://www.ancon.co.uk.

* cited by examiner

FIG. 5
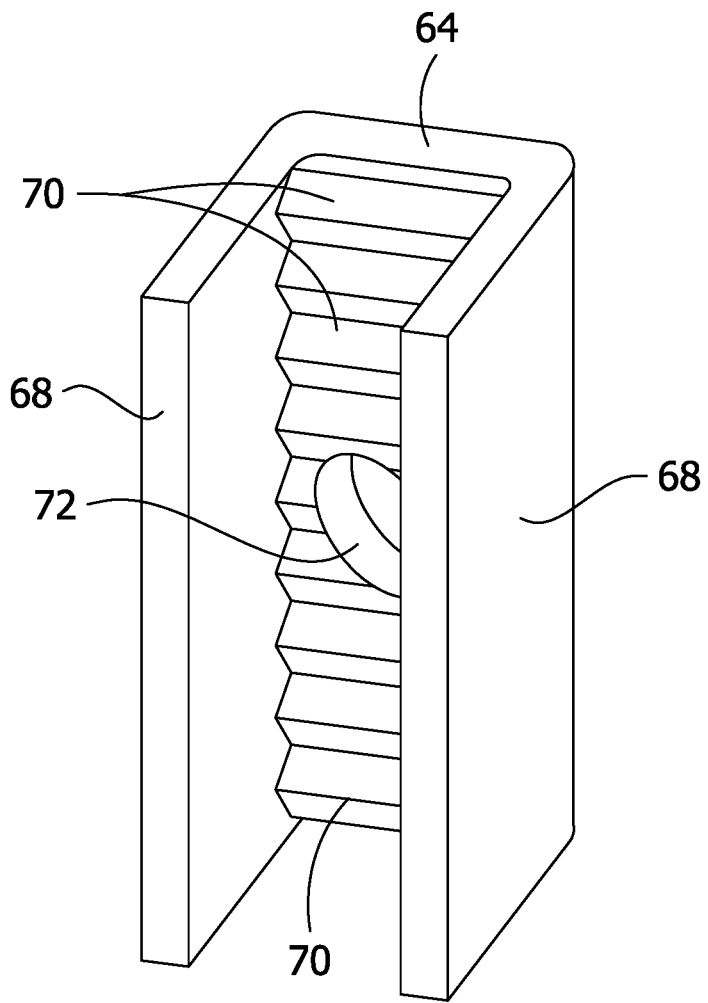

MASONRY SUPPORT

FIELD OF THE INVENTION

The present invention generally relates to a facade support system used in building construction, and more specifically, to a thermally insulating facade support system.

BACKGROUND

A facade can be a durable and aesthetically desirable construction for a building exterior. Facades, such as brick or stone veneer walls, also provide protection to the interior of the building from the surrounding environment. Facade supports are typically metal structures attached to inner walls of the building and provide a support surface for the outer veneer wall and transfer the load of the veneer wall to the inner walls of the building. Facade supports can also penetrate insulation used within the building walls. However, thermal bridging occurs when the insulation is penetrated by material with relatively high thermal conductivity, such as the metal supports, and this can affect the overall thermal performance of the building. Minimizing the thermal bridging caused by the facade supports can be beneficial to the thermal performance of the building. Additionally, it is important to ensure that the facade supports are properly attached to the inner walls of the building so that the outer veneer can be constructed to be level.

SUMMARY

In one aspect, facade support system for attachment to a wall of a structure for supporting a veneer on the wall of the structure comprises a bracket configured for attachment to the wall. The bracket includes a connecting plate and a mounting member. A support attached to the connecting plate of the bracket is configured to be disposed in a mortar bed joint of the veneer. A standoff positioned for engagement with the wall is selectively attachable to the connecting plate in different locations on the standoff to orient the bracket relative to the wall for maintaining a substantially horizontal position of the support.

In another aspect, a facade support system for attachment to a wall of a structure for supporting a veneer on the wall of the structure comprises a bracket configured for attachment to the wall. The bracket includes a connecting plate and a mounting member having first detents. A support attached to the connecting plate of the bracket is configured to be disposed in a mortar bed joint of the veneer. A washer is attachable to the mounting member for attaching the bracket to the wall. The washer engages the first detents of the mounting member.

In yet another aspect, a facade support system for attachment to a wall of a structure for supporting a veneer on the wall of the structure comprises a bracket configured for attachment to the wall. The bracket includes a connecting plate and a mounting member, where each of the connecting plate and the mounting member has first detents. A support attached to the connecting plate of the bracket is configured to be disposed in a mortar bed joint of the veneer.

Other objects and features will be in part apparent and in part pointed out hereinafter.

BRIEF DESCRIPTION OF THE DRAWINGS

FIG. 5 is a perspective of a washer of the facade support system;

Corresponding reference characters indicate corresponding parts throughout the drawings.

DESCRIPTION OF THE PREFERRED EMBODIMENTS

Figure 1:
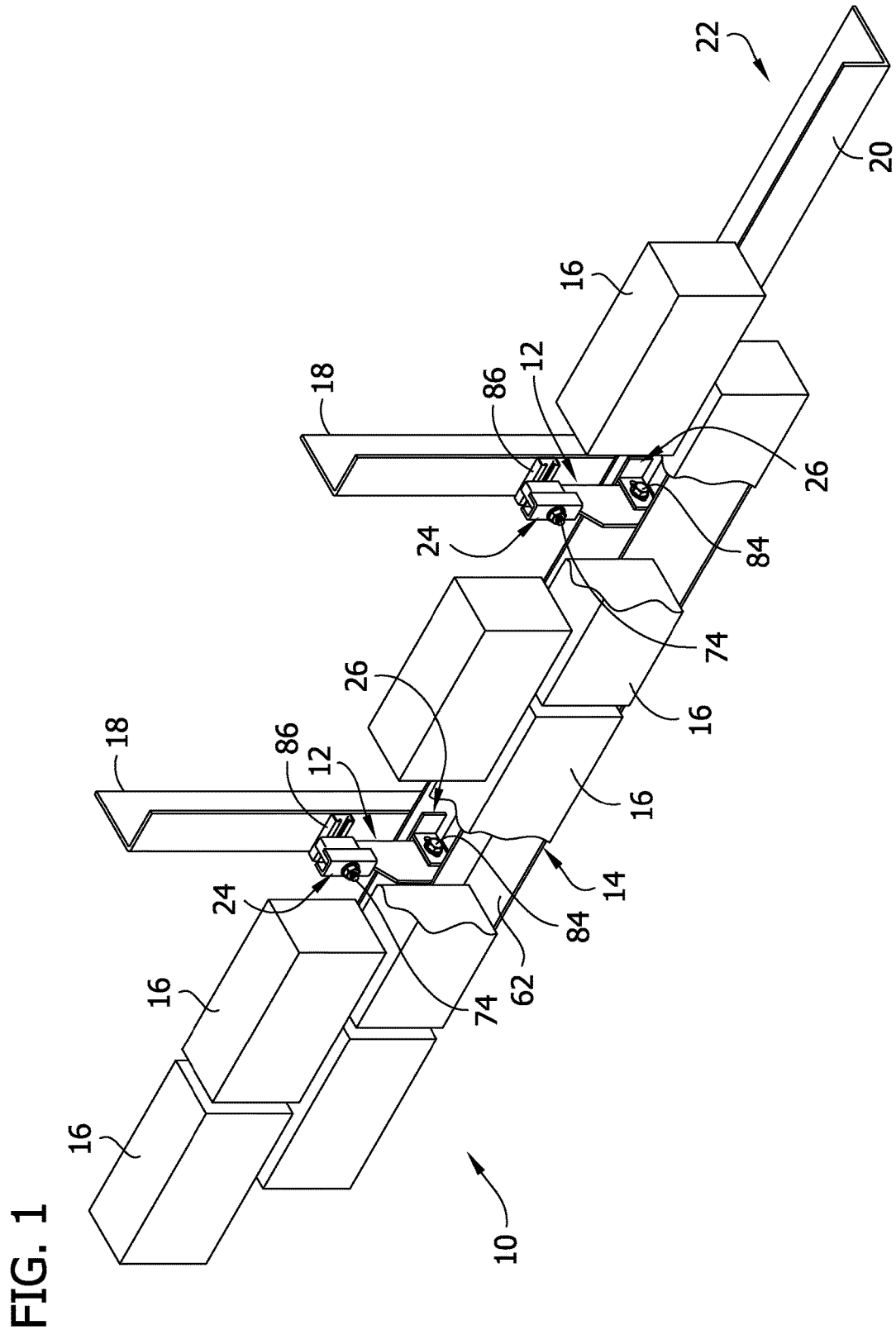
FIG. 1 is a schematic perspective of a veneer wall with portions removed showing a facade support system of the present invention attached to a steel back-up.
Figure 2:
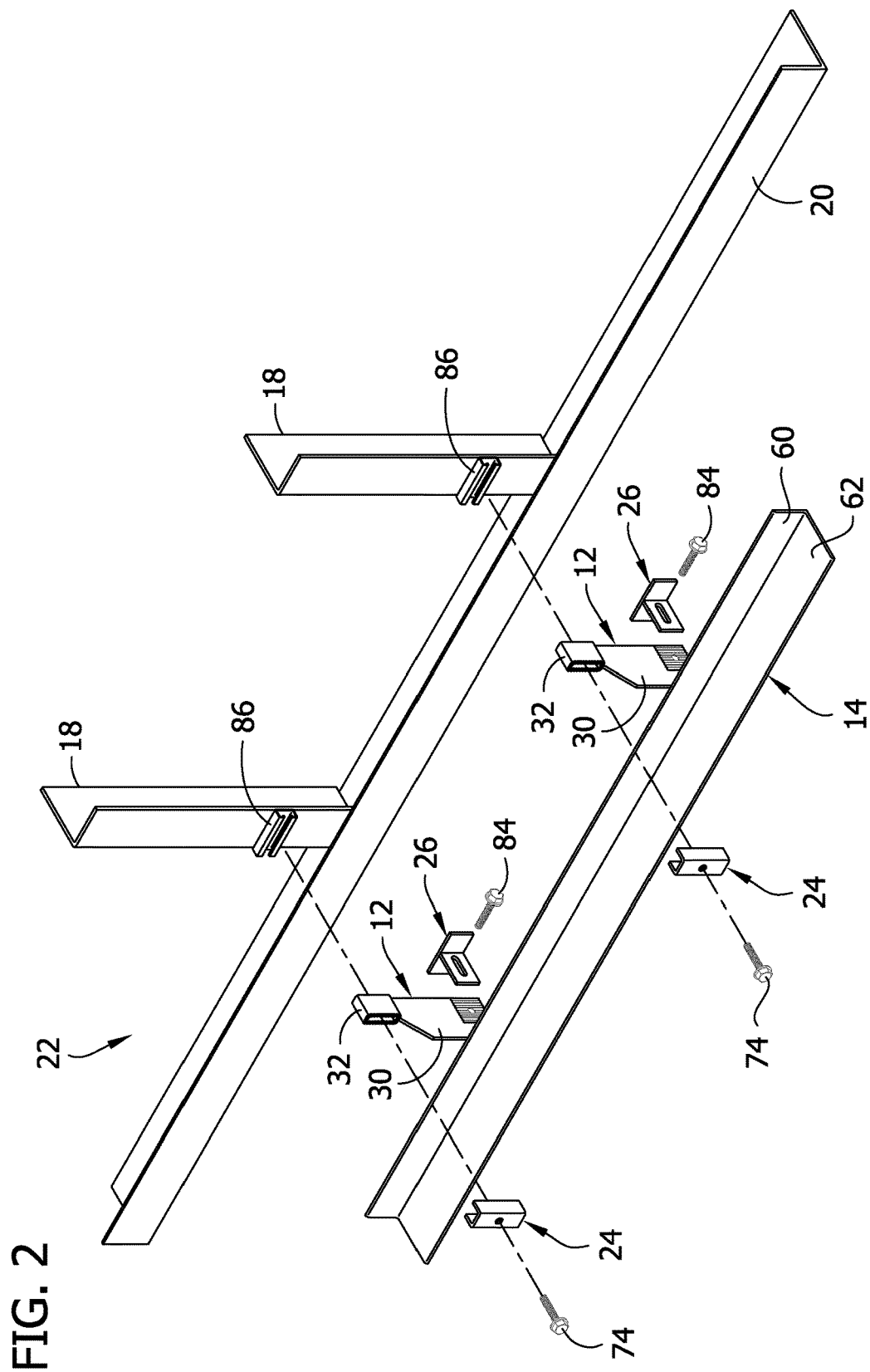
FIG. 2 is an exploded perspective of the facade support system and steel back-up of FIG. 1.

Referring to FIGS. 1 and 2, a facade support system indicated generally at 10 includes spaced apart support brackets 12 and a support angle 14 (broadly, "a support") attached to the support brackets for supporting the weight of a veneer wall made up in the illustrated embodiment of bricks 16 to form a building's brick facade. It will be understood that stone or other suitable veneer may be supported using the facade support system of the present invention. In the illustrated embodiment, the brackets 12 are attached to vertical and horizontal frame members 18, 20 of a steel back-up 22. The support system 10 transfers the weight of the bricks 16 to the steel back-up 22 attached to a wall (not shown). In this embodiment, the steel back-up 22 is considered to be part of the wall to which they would be attached in a suitable manner to transfer at least a portion of the load of the bricks to the wall. Thus, the facade support system 10 supports the weight of the bricks 16 forming the building facade. The facade support system 10 is configured such that it is concealed within the bricks 16 when the facade is complete. Insulation (not shown) may be disposed around the brackets 12 between the frame members 18, 20 and the bricks 16. The narrow profile configuration of the brackets 12 allows for less penetration of the insulation thereby reducing the amount of thermal bridging and energy loss throughout the building. The support system 10 also provides for easy and adjustable attachment to the steel back-up 22 to ensure that the support angle 14 is properly oriented on the frame members 18, 20.

The support brackets 12 are fixedly attached to the support angle 14 and adjustably attached to the frame members 18, 20. In one embodiment, the brackets 12 are welded to the support angle 14. The brackets 12 could be attached to the support angle 14 by other means or formed as one piece of material with the support angle without departing from the scope of the disclosure. Channel-shaped washers 24 facilitate the adjustable attachment of the brackets 12 to the vertical frame members 18, and standoffs 26 facilitate the adjustable engagement of the brackets with the horizontal frame member 20. The adjustable attachment allows for the support system 10 to account for the vertical frame members 18 being out of plumb and the horizontal frame member 20 being skewed from horizontal ensuring that the support angle 14 is disposed substantially horizontal regardless of the orientation of the frame members.

Figure 3:
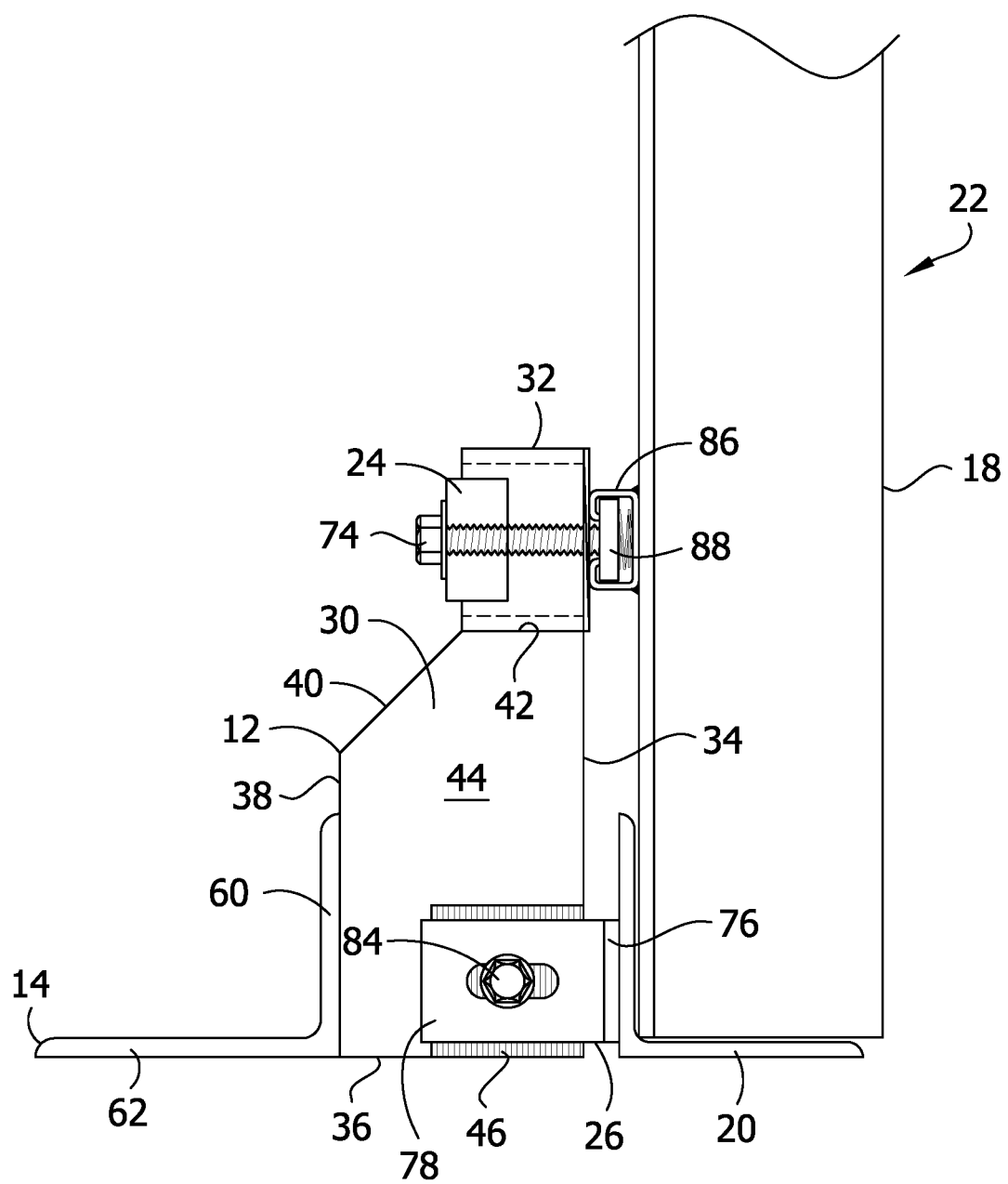
FIG. 3 is a side view of the facade support system and the steel back-up partially broken away.
Figure 4:
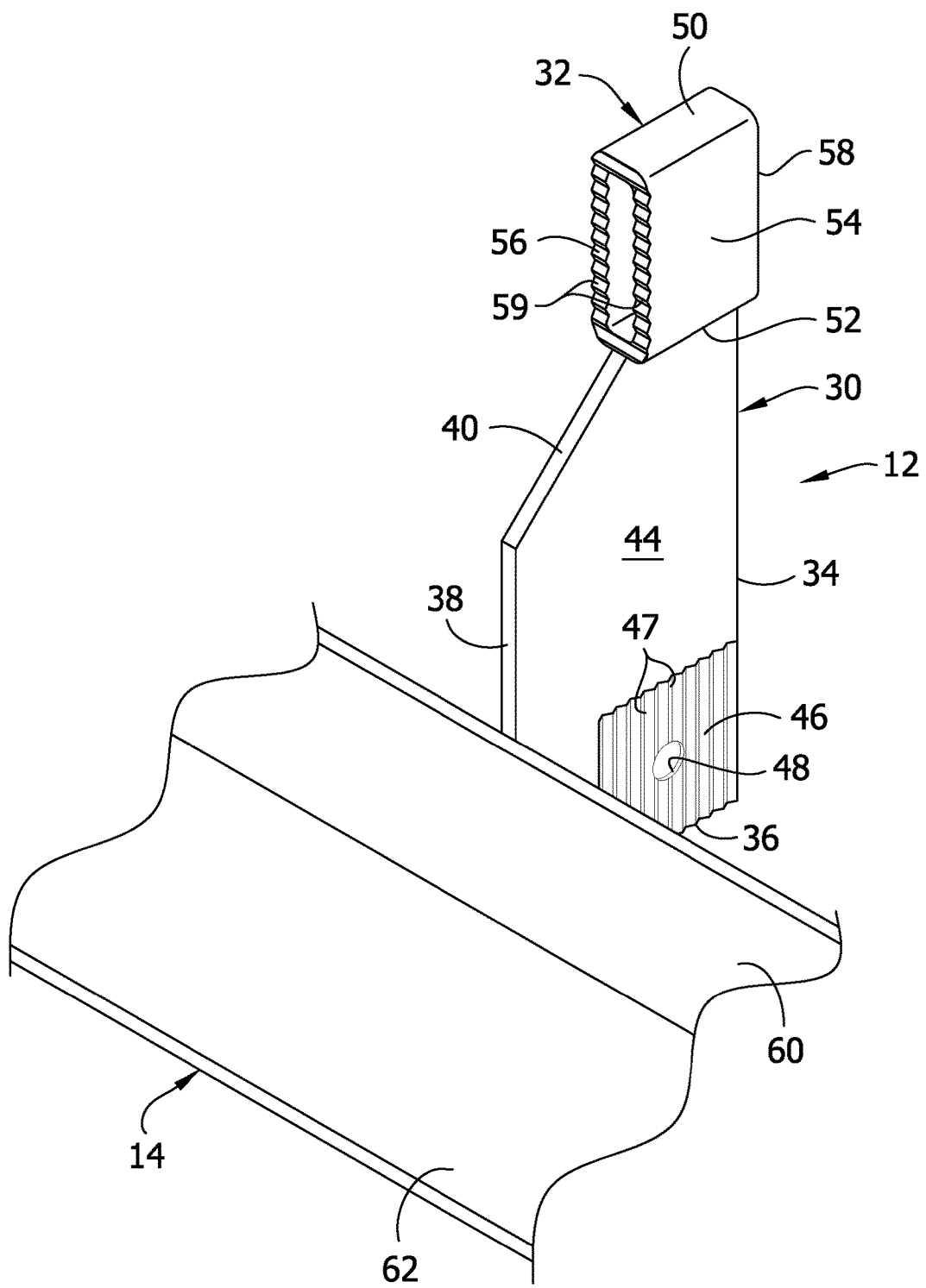
FIG. 4 is an enlarged fragmentary perspective of the facade support system.
Figure 6:
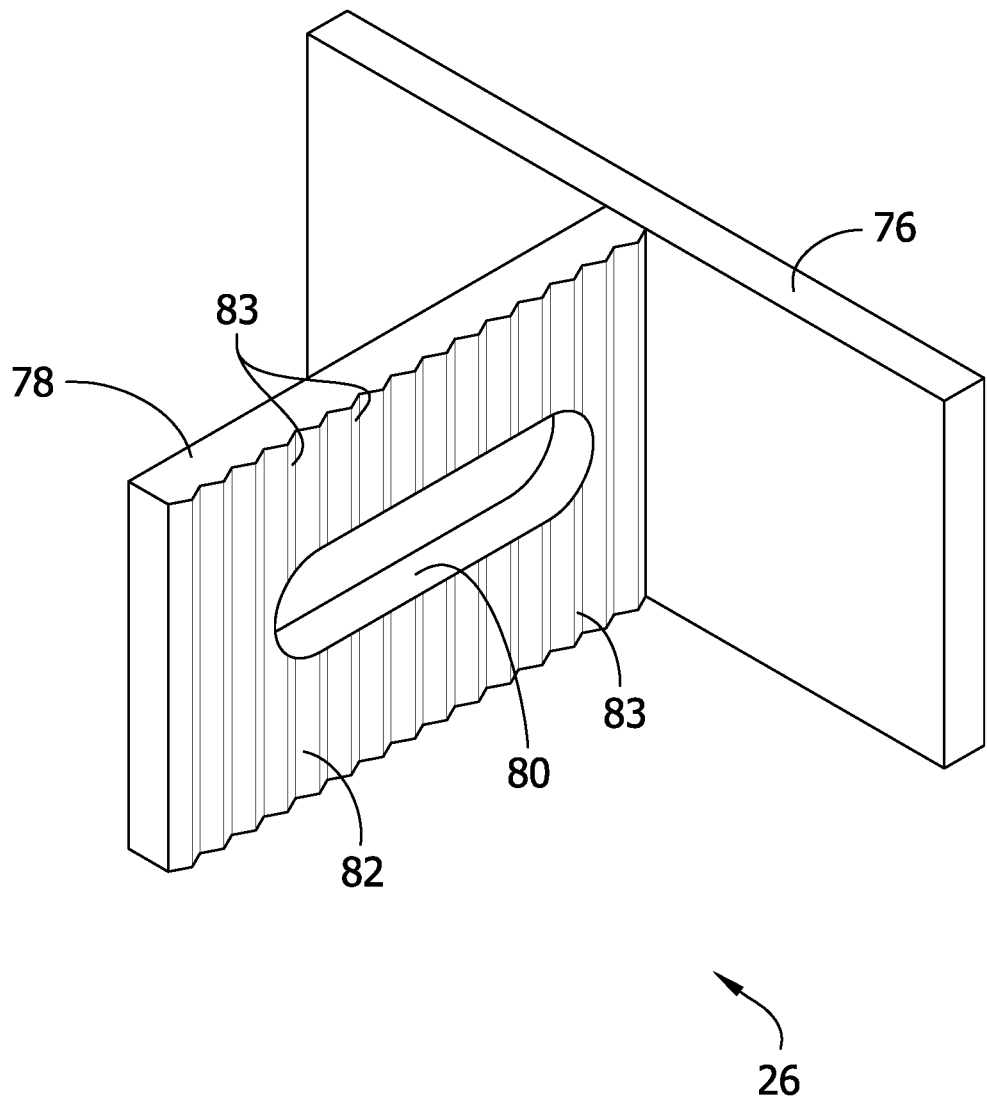
FIG. 6 is a perspective of an standoff of the facade support system.

Referring to FIGS. 2-4, each support bracket 12 comprises a connecting plate member 30 and a mounting socket 32 (broadly, a mounting member) mounted on a top of the plate member. In the illustrated embodiment, the plate member 30 comprises a five-sided, substantially flat plate. The plate member 30 includes a first edge 34 extending vertically along the bracket 12 and defining a back edge of the bracket. A second edge 36 extends horizontally from a bottom of the first edge 34 toward a front of the bracket 12. The second edge 36 defines a bottom edge of the bracket 12. A third edge 38 extends vertically upward from a front of the second edge 36. The third edge 38 defines a portion of a front edge of the bracket 12. A fourth edge 40 extends upward from the third edge 38 at an angle toward the back edge of the bracket 12. The fourth edge 40 also defines a portion of the front edge of the bracket 12. A fifth edge 42 extends horizontally from a top of the fourth edge 40 toward the back of the bracket 12 to a top of the first edge 34. The fifth edge 42 defines a top edge of the bracket 12. The edges of the bracket 12 define the bounds of a pair of side surfaces 44. At least one side surface 44 includes a serrated portion 46 made up of first detents 47 and including a bolt hole 48. As will be explained in greater detail below, the serrated portion 46 facilitates adjustable connection of the bracket 12 to the horizontal frame member 20. The connecting plate member 30 of the bracket 12 could have a different configuration including a different number of sides without departing from the scope of the disclosure.

The mounting socket 32 is attached as by welding to the top of the bracket 12 along the top edge 42 of the bracket. The mounting socket 32 comprises a hollow rectangular tube including a top surface 50, a bottom surface 52, a pair of side surfaces 54, a front face 56 and a rear face 58. The bottom surface 52 is attached to the top edge 42 of the bracket 12. The front face 56 is serrated. The serrations on the front face 56 are formed by first-detents 59 that facilitate adjustable connection of the bracket 12 to the washer 24, as will be explained in greater detail below. The mounting socket 32 could have a different shape and configuration without departing from the scope of the disclosure. For instance, the mounting socket could be U-shaped.

The support angle 14 is attached as by welding to the front of the brackets 12 along the third edge 38 of the brackets. The support angle 14 comprises a first, vertical plate member 60 attached to the brackets 12, and a second, horizontal plate member 62 extending from a bottom of the first plate member. The horizontal plate member 62 is configured to be disposed in a mortar bed joint of the brick facade. The horizontal plate member 62 is thin and flat so as not to significantly alter the height of the mortar bed joint in which it is received. The horizontal plate member 62 is planar and free of projections from its top or bottom surfaces. Thus, the support angle 14 can be positioned anywhere along a length of a mortar bed joint.

Referring to Figs, 1-3 and 5, the washers 24 are used to attach the brackets 12 to the vertical frame members 18. Each washer 24 comprises an elongate, channel-shaped member including a base portion 64 and arms 68 extending orthogonally from sides of the base portion. An inner surface of the base portion 64 has serrations formed by second detents 70 configured for engagement with the first detents 59 on the front face 56 of the mounting socket 32 of the bracket 12. The base portion 64 also has a hole 72 formed therein for receiving a bolt 74 for attaching the washer 24 to the bracket 12 and the bracket to the vertical frame member 18, as will be explained in greater detail below. It is envisioned that the washer 24 could have other configurations without departing from the scope of the disclosure. For example, the washer could have a standard washer shape without extending arms.

Referring to FIGS. 1-3 and 6, the standoffs 26 are used to engage the brackets 12 with the horizontal frame member 20. In the illustrated embodiment, the standoffs 26 are T-shaped comprising a first plate member 76 and a second plate member 78 projecting orthogonally from the first plate member. A slot 80 is formed in the second plate member 78. A surface 82 of the second plate member 78 is serrated for engagement with the serrated portion 46 on a side surface 44 of the bracket 12. The serrated portion 46 of the connecting plate 30 is made up of plural first detents 47 and serrated surface 82 is made up of plural second detents 83. The slot 80 is configured to receive a bolt 84 for attaching the standoff 26 to the bracket 12 and the bracket to the horizontal frame member 20, as will be explained in greater detail below. It is envisioned that the standoffs 26 could have other configurations without departing from the scope of the disclosure.

Referring to FIGS. 1-3, channel members 86 are attached to the vertical frame members 18. In one embodiment, the channel members 86 are welded to the vertical frame members 18. To attach the support brackets 12 and support angle 14 to the steel back-up 22, each bracket 12 is attached to a respective channel member 86 by locating the mounting socket 32 against the channel member and engaging a respective washer 24 with the mounting socket. The washer 24 and mounting socket 32 are secured to the channel member 86 by inserting bolt 74 through hole 72 in the washer and through the hollow mounting socket and into the channel member. A nut 88 captured in the channel member 86 threadably engages a shaft of the bolt 74 so that the bolt can be tightened to clamp the mounting socket 32 between the washer 24 and the channel member 86 and thereby secure the bracket 12 to the vertical frame member 18. Additionally, the second detents 70 on the inner surface of the washer 24 engage the first detents 59 on the front face 56 of the mounting socket 32 to lock the washer in place on the mounting socket thus substantially preventing any relative vertical movement between the two. However, prior to locking the washers 24 to the bracket 12, the serrations allow for the relative positions of the washer and bracket to be adjusted to suit the construction of the frame members 18, 20 so that the brackets 12 and angle support 14 are oriented in the desired position for supporting the bricks 16. For example, the washer 24 can be moved upwards and downward along the mounting socket 32 to locate the bracket 12 and angle support 14 in the desired vertical position. This adjustment may be necessary to account for any skewed or out of plumb positioning during the erecting of the frame members 18, 20.

In one embodiment, the second detents 70 on the inner surface of the washer 24 and the first detents 59 of the serrated front face 56 of the mounting socket 32 are spaced apart by ¹⁄₁₆ in (1.6 mm). This closely spaced separation of the detents 59, 70 allows for fine-tuned adjustment of the relative positions of the mounting socket 32 and washer 24. Other degrees of spacing are also envisioned without departing from the scope of the disclosure. In one embodiment, a height of the mounting socket 32 can be selected based on the level of adjustment desired for a given building framework. The longer the mounting socket the greater the amount of adjustment that will be available between the mounting socket and the washer. In one embodiment, the side surfaces 54 of the mounting sockets 32 could be serrated and the inner surfaces of the arms 68 of the washers 24 could be serrated. The adjustment of the mounting sockets and washers would function substantially the same as in the illustrated embodiment.

The brackets 12 are engaged with the horizontal frame member 20 by attaching the standoffs 26 to the horizontal frame member and inserting bolts 84 through the slots 80 in the standoffs and into the bolt holes 48 of the connecting plate members 30 of the brackets. The standoffs 26 can be selectively positioned on the horizontal frame member 20 to fix the brackets 12 and support angle 14 in the desired orientation for supporting the bricks 16. The second detents 83 of the serrated surfaces 82 on the standoffs 26 engage the first detents 47 of the serrated portions 46 on the brackets 12 to lock the standoffs in place on the connecting plate member 30 thus substantially preventing any relative movement between the two structures. However, prior to locking the standoff to the bracket 12, the serrations allow for the relative positions of the standoff and bracket to be adjusted to suit the construction of the frame members 18, 20. For example, the connecting plate member 30 of the bracket can be moved toward and away from the horizontal frame member 20 to orient the angle support 14 in the desired horizontal position. This can accommodate skewed or out of plumb positioning during the erecting of the frame members 18, 20 such that the vertical plate member 60 of the angle support 14 is maintained in a substantially vertical position, and the horizontal plate member 62 is maintained in a substantially horizontal position when attached to the frame members.

In one embodiment, the second detents 83 on the standoffs 26 and the first detents 47 on the connecting plate members 30 of the brackets 12 are spaced apart by ¹⁄₁₆ in (1.6 mm). This close phase separation of the detents 47, 83 allows for fine-tuned adjustment of the relative positions of the connecting plate member 30 and standoff 26. Other degrees of spacing are also envisioned without departing from the scope of the disclosure.

Figure 7:
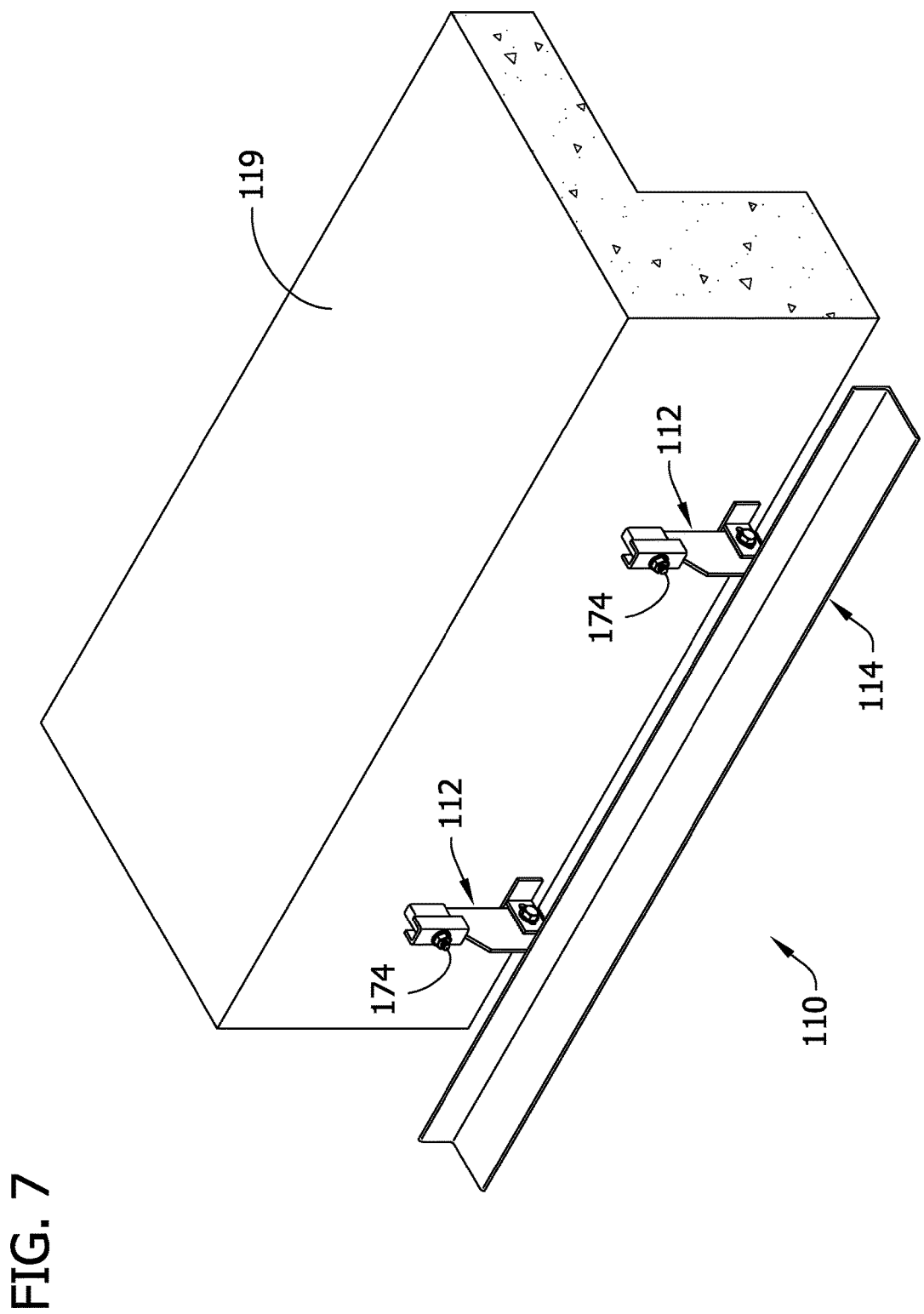
FIG. 7 is a schematic perspective of a facade support system of another embodiment attached to a concrete back-up.
Figure 8:
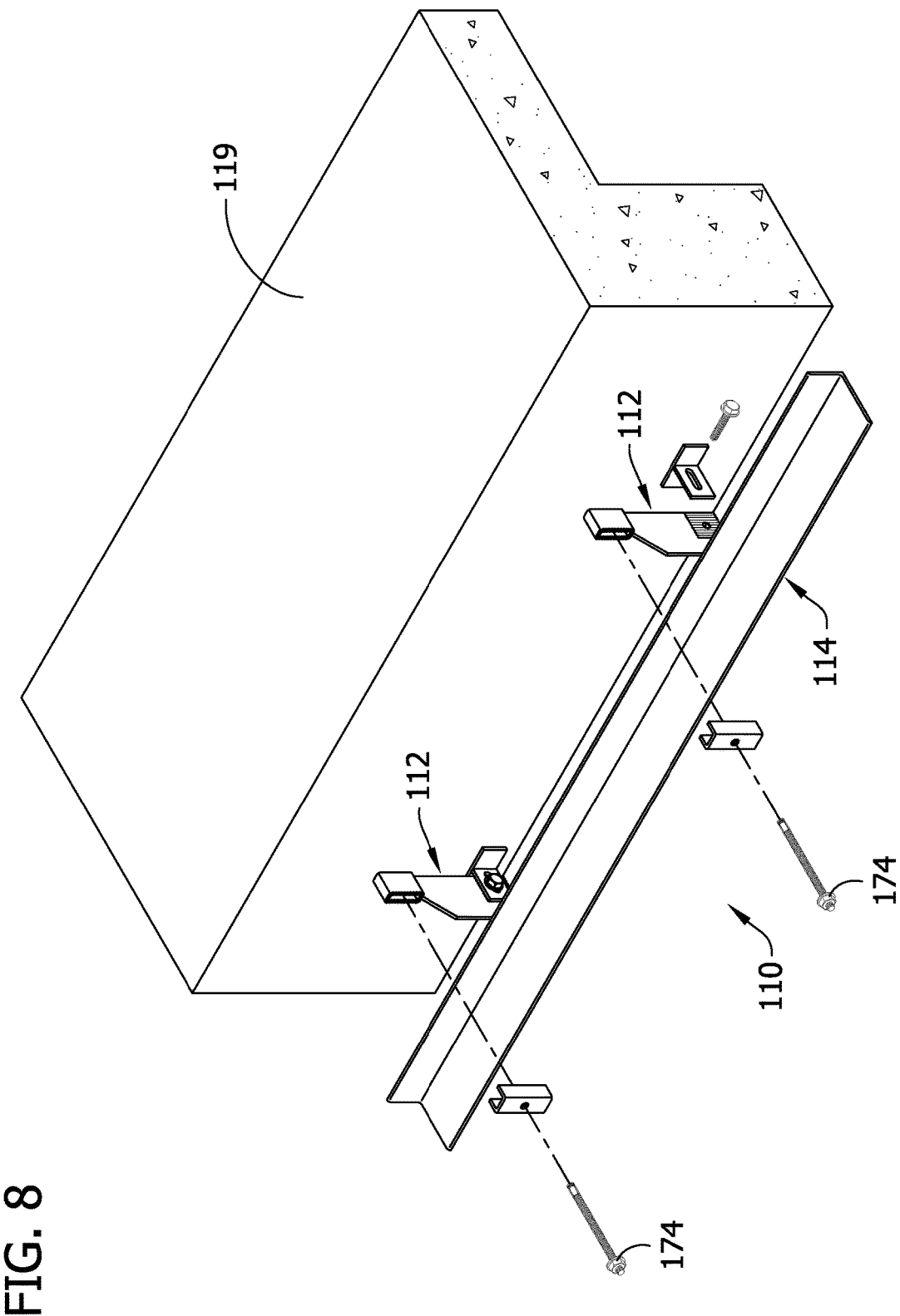
FIG. 8 is a partially exploded view of the perspective of FIG. 7.
Figure 9:
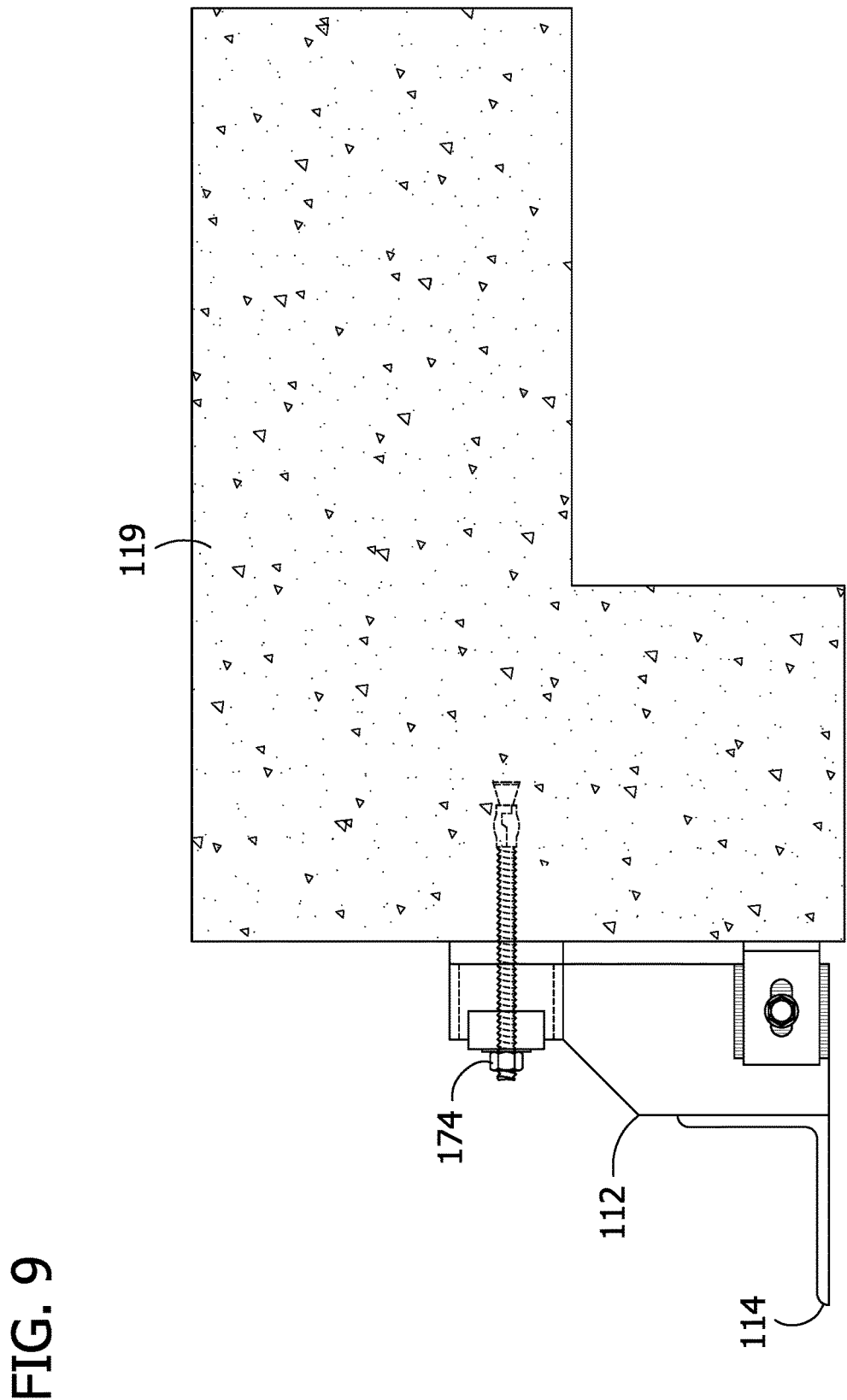
FIG. 9 is an enlarged side view of the facade support system and concrete back-up of FIG. 7.

Referring to FIGS. 7-9, a facade support system indicated generally at 110 includes spaced apart support brackets 112 and a support angle 114 attached to the support brackets for supporting the weight of bricks (not shown) to form a building's brick facade. The support system 110 is substantially similar to the support system 10 of the first embodiment except fasteners 174 comprise concrete fasteners for attaching brackets 112 directly to a concrete back-up wall 119 of a building. There is no steel back-up 22 as in the first embodiment. The support system 110 transfers the weight of the bricks to the concrete backup wall 119. Thus, the facade support system 110 supports the weight of the bricks on the building facade. The facade support system 110 is configured such that it is concealed within the bricks when the brick facade is complete. Insulation (not shown) may be disposed around the brackets 112 between the concrete backup wall 119 and the bricks 116. The narrow profile configuration of the brackets 112 allows for less penetration of the insulation thereby reducing the amount of thermal bridging and energy loss throughout the building. The support system 110 also provides for easy and adjustable attachment to the concrete backup wall 119. Thus, the facade support system 110 is otherwise configured identically to the support system 10 of the first embodiment.

Figure 10:
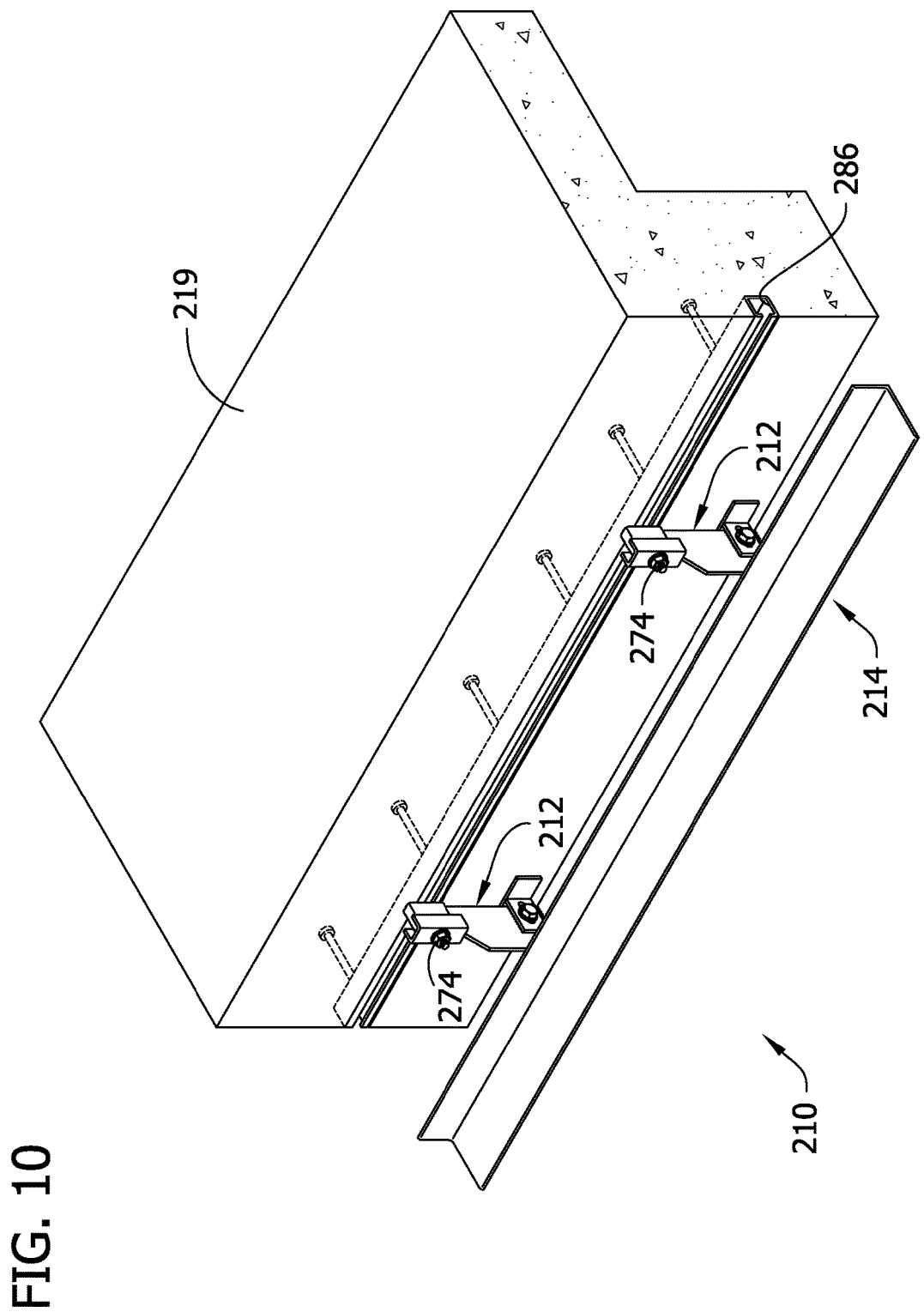
FIG. 10 is a schematic perspective of a facade support system of another embodiment attached to a concrete back-up.
Figure 11:
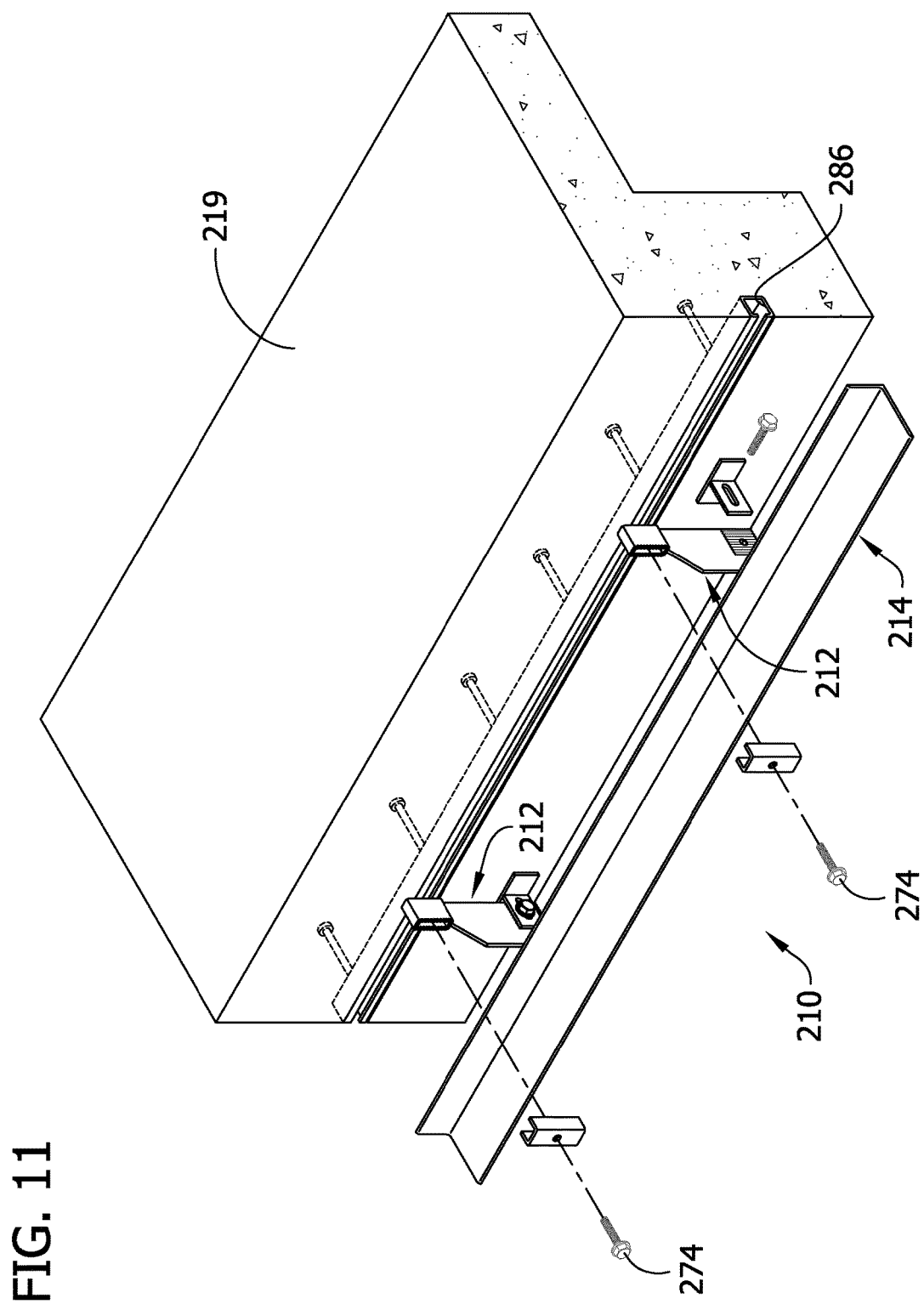
FIG. 11 is a partially exploded view of the perspective of FIG. 10.
Figure 12:
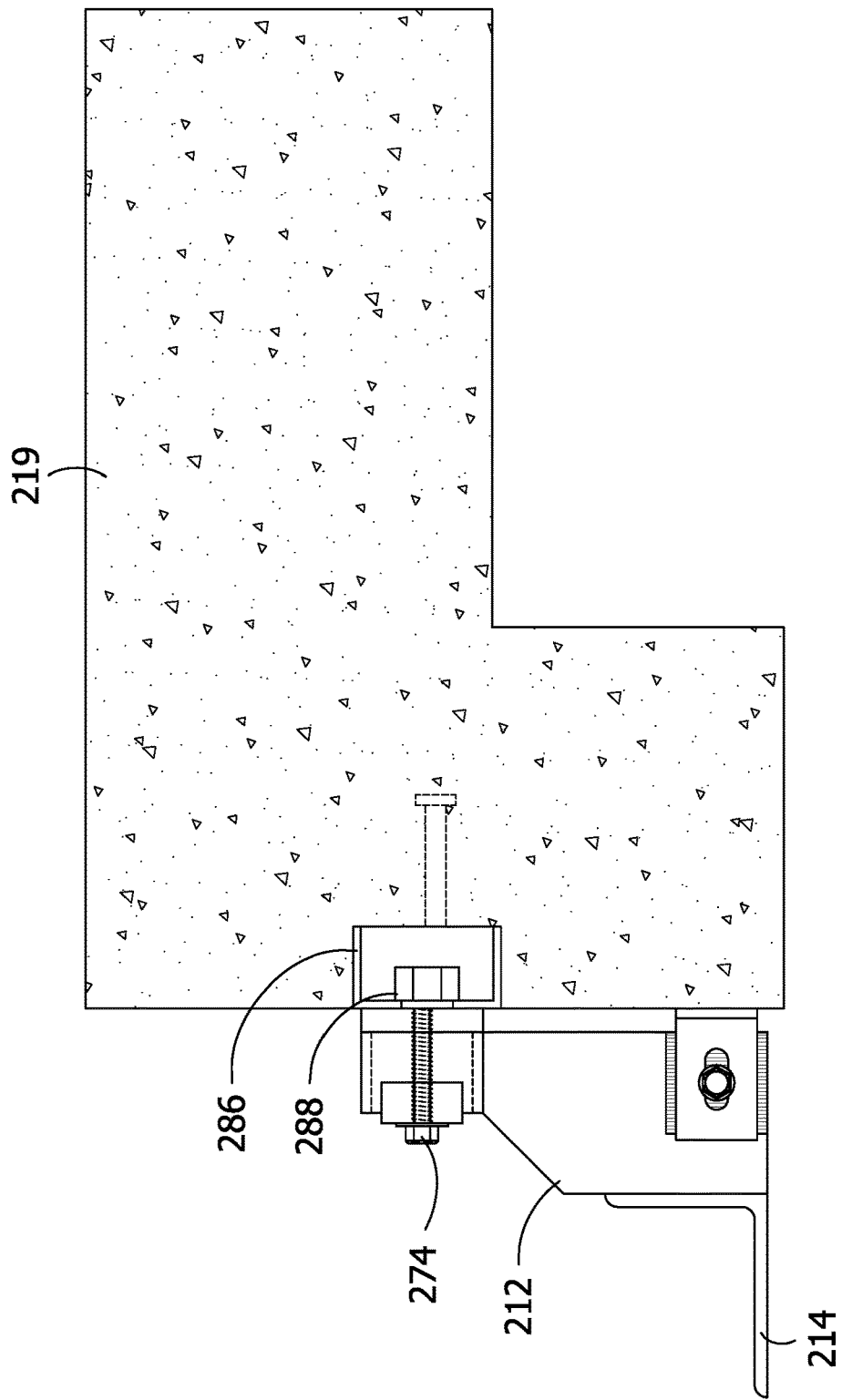
FIG. 12 is an enlarged side view of the facade support system and concrete back-up of FIG. 10.

Referring to FIGS. 10-12, a facade support system indicated generally at 210 includes spaced apart support brackets 212 and a support angle 214 attached to the support brackets for supporting the weight of bricks (not shown) to form a building's brick facade. The support system 210 is substantially similar to the support system 10 of the first embodiment except bolts 274 attach brackets 112 to a concrete back-up wall 219 of a building. The back-up wall 219 includes an embedded channel 286 and nuts 288 in the channel for engaging with the bolts 274 to secure the support system 210 to the concrete back-up wall 219. For example, the channel 286 may include a sharktooth or "CSH" channel. Other channel configurations are envisioned without departing from the scope of the disclosure. The support system 210 transfers the weight of the bricks to the concrete back-up wall 219. Thus, the facade support system 210 supports the weight of the bricks on the building facade. The facade support system 210 is configured such that it is concealed within the bricks when the brick facade is complete. Insulation (not shown) may be disposed around the brackets 212 between the concrete back-up wall 219 and the bricks. The narrow profile configuration of the brackets 212 allows for less penetration of the insulation thereby reducing the amount of thermal bridging and energy loss throughout the building. The support system 210 also provides for easy and adjustable attachment to the concrete back-up wall 219. Thus, the facade support system 210 is otherwise configured identically to the support system 10 of the first embodiment.

Figure 13:
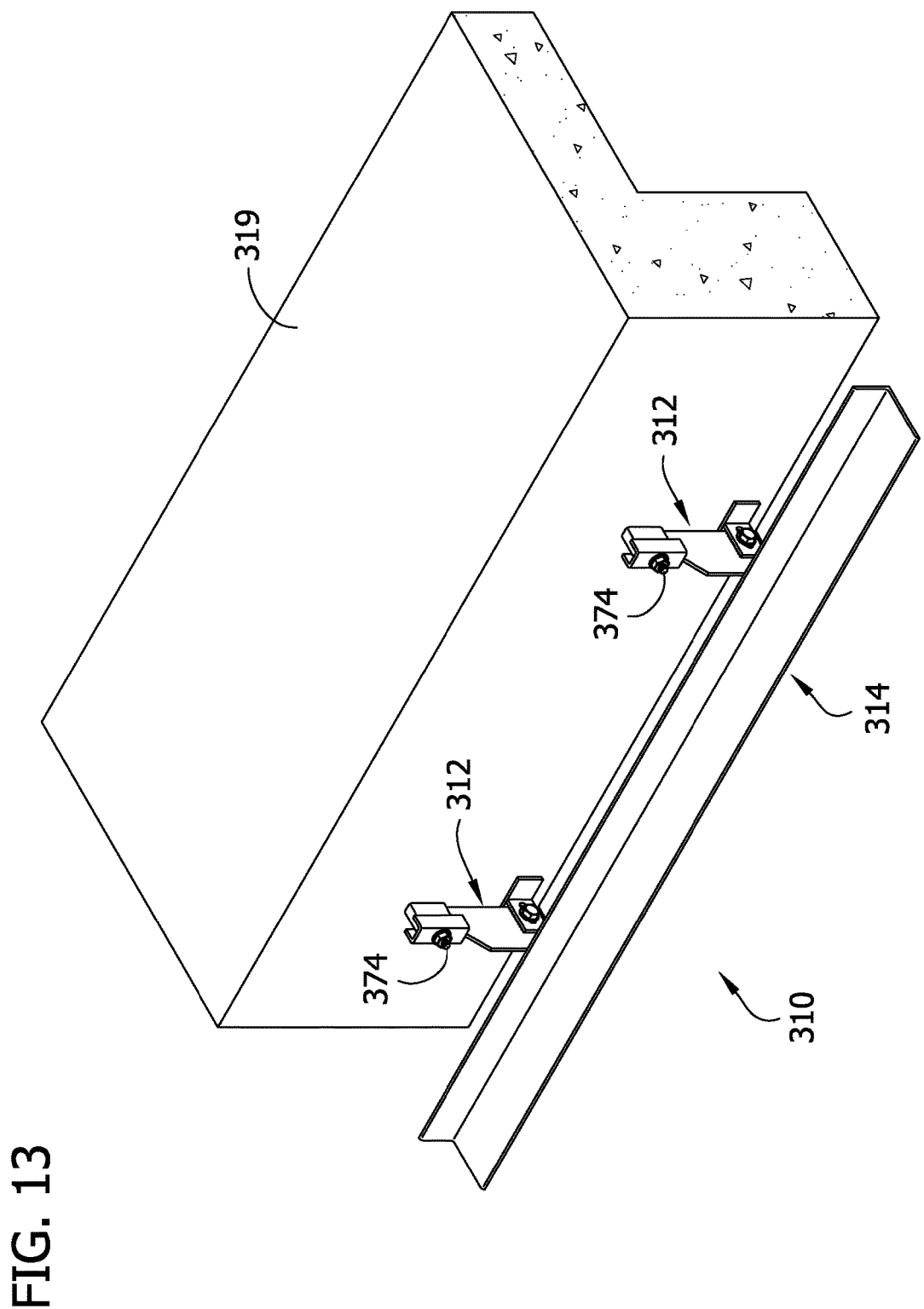
FIG. 13 is a schematic perspective of a facade support system of another embodiment attached to a concrete back-up.
Figure 14:
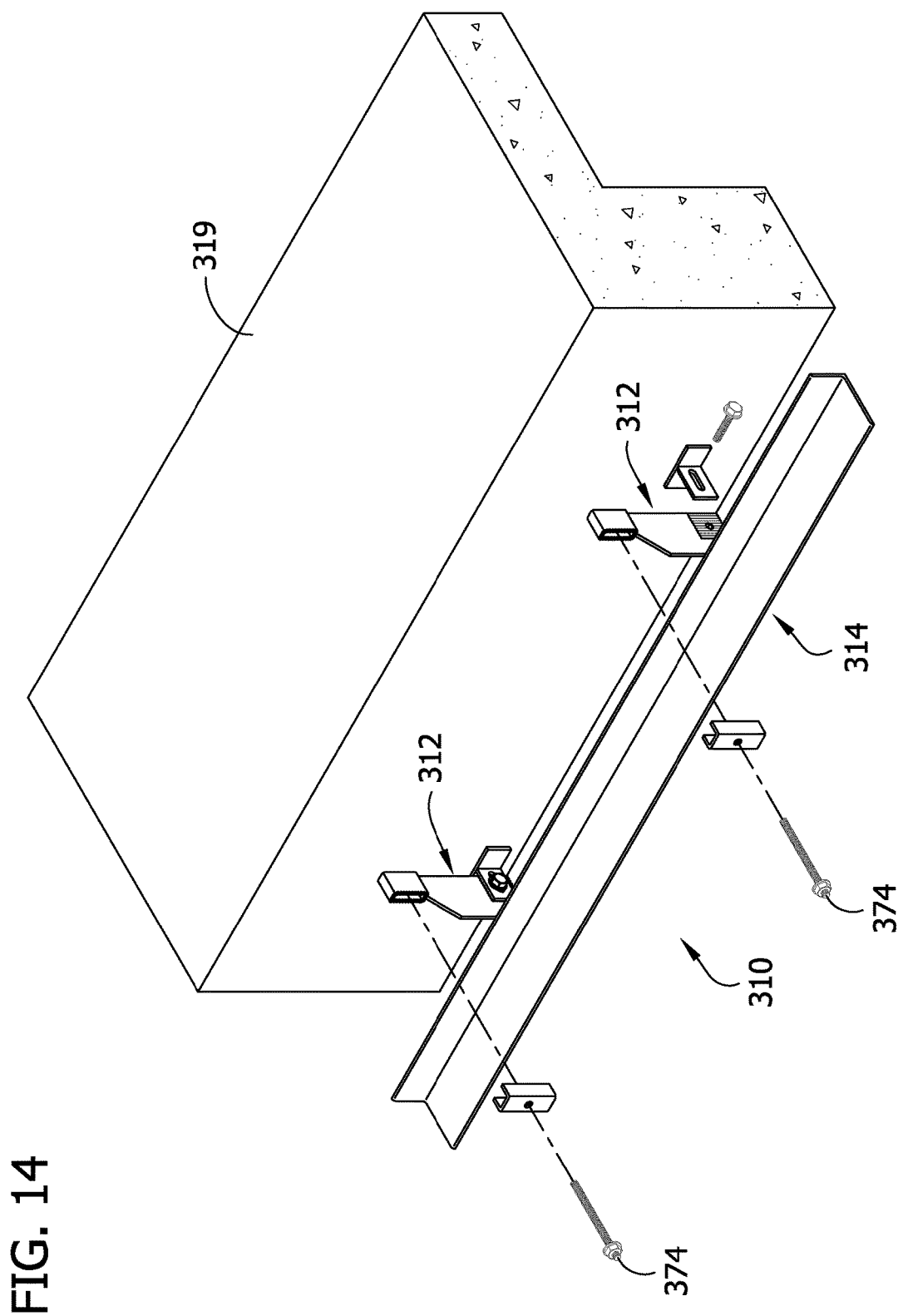
FIG. 14 is a partially exploded perspective of FIG. 13.
Figure 15:
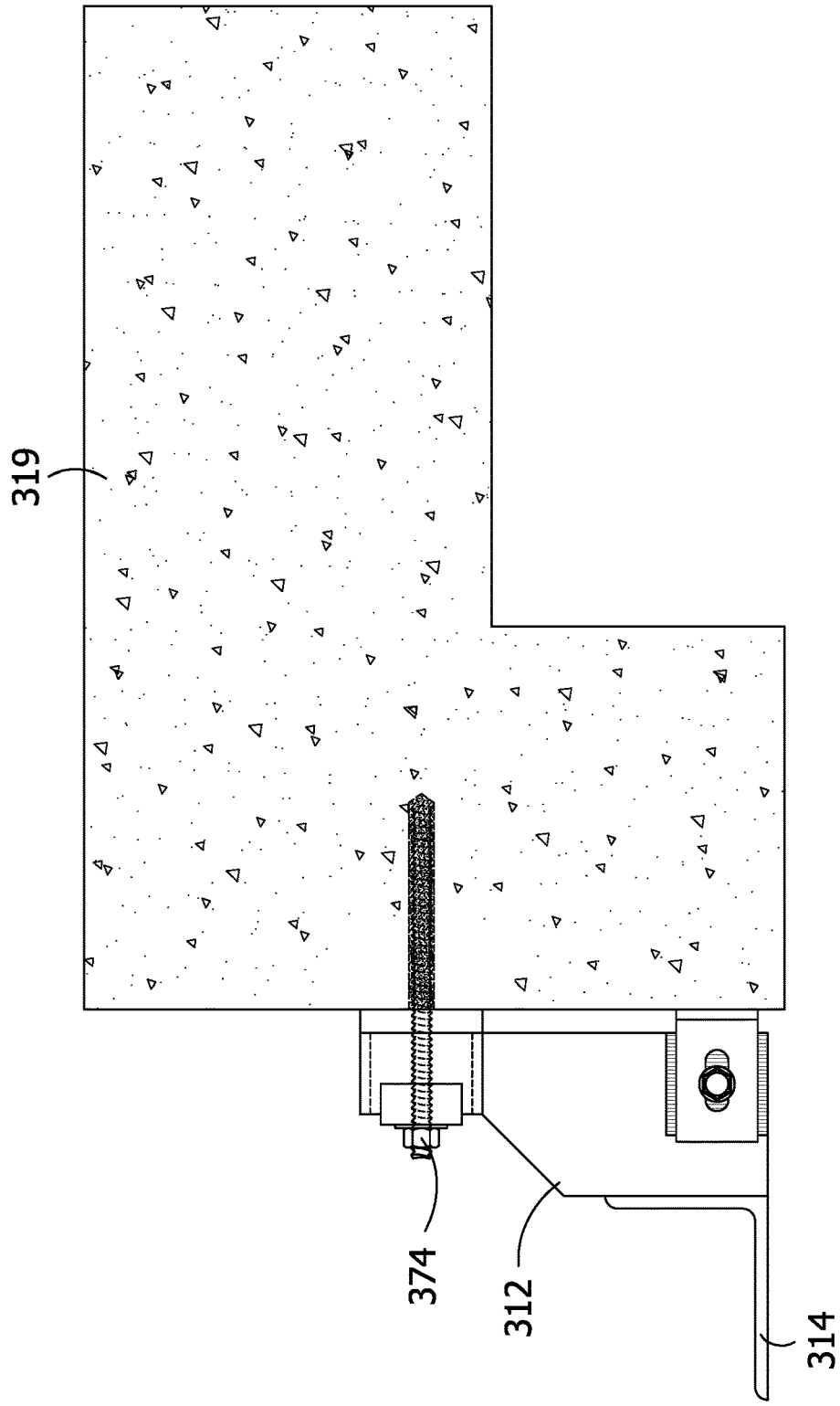
FIG. 15 is an enlarged side view of the facade support system of FIG. 13.

Referring to FIGS. 13-15, a facade support system indicated generally at 310 includes spaced apart support brackets 312 and a support angle 314 attached to the support brackets for supporting the weight of bricks (not shown) to form a building's brick facade. The support system 110 is substantially similar to the support system 10 of the first embodiment except fasteners 374 comprise a threaded rod and epoxy system of a type known to those of ordinary skill in the art for attaching brackets 312 to a concrete back-up wall 319 of a building. The support system 310 transfers the weight of the bricks to the concrete back-up wall 319. Thus, the facade support system 310 supports the weight of the bricks on the building facade. The facade support system 310 is configured such that it is concealed within the bricks when the brick facade is complete. Insulation (not shown) may be disposed around the brackets 312 between the concrete back-up wall 319 and the bricks. The narrow profile configuration of the brackets 312 allows for less penetration of the insulation thereby reducing the amount of thermal bridging and energy loss throughout the building. The support system 310 also provides for easy and adjustable attachment to the concrete back-up wall 319. Thus, the facade support system 310 is otherwise configured identically to the support system 10 of the first embodiment.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including"

and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A facade support system for attachment to a wall of a structure for supporting a veneer on the wall of the structure, the system comprising:
    a bracket configured for attachment to the wall, the bracket comprising a connecting plate and a mounting member;
    a support attached to the connecting plate of the bracket and configured to be disposed in a mortar bed joint of the veneer; and
    a standoff positioned for engagement with the wall and selectively attachable to the connecting plate in different locations on the standoff to orient the bracket relative to the wall for maintaining a substantially horizontal position of the support;
    wherein the connecting plate interconnects the support and the mounting member.

2. The system of claim 1, wherein the standoff includes a slot formed in the standoff for receiving a fastener to attach the standoff to the connecting plate in the different locations.

3. The system of claim 2, wherein the standoff comprises a first plate member and a second plate member projecting from the first plate member, the slot being formed in the second plate member.

4. The system of claim 1, wherein the connecting plate and the standoff are constructed and arranged so that attachment of the connecting plate in different locations on the standoff changes the orientation of the bracket relative to the wall.

5. The system of claim 4, wherein the mounting member has first detents disposed on a front of the mounting member.

6. The system of claim 4, further comprising a washer attachable to the mounting member for attaching the bracket to the wall, the washer having an elongate shape.

7. The system of claim 1, wherein the system is free of an additional support bracket for mounting between the mounting member and the wall to adjust the position of the bracket on the wall.

8. The system of claim 1 wherein the bracket comprises a first bracket, the system further comprising a second bracket configured for attachment to the wall, the support being attached to the second bracket.

9. The system of claim 1 wherein the support includes a horizontal plate member sized and shaped to be received in the mortar bed joint of the veneer, the horizontal plate member being free of projections along its length.

10. A facade support system for attachment to a wall of a structure for supporting a veneer on the wall of the structure, the system comprising:
    a bracket configured for attachment to the wall, the bracket comprising a connecting plate and a mounting member, the mounting member having first detents, the mounting member being nonadjustably fixed to the connecting plate;
    a support attached to the connecting plate of the bracket and configured to be disposed in a mortar bed joint of the veneer; and
    a washer attachable to the mounting member for attaching the bracket to the wall, the washer including second detents for adjustable mating with the first detents of the mounting member, whereby adjustment of the mounting member relative to the washer adjusts the position of the bracket on the wall.

11. The system of claim 10, wherein the first and second detents are arranged for vertical adjustment of the mounting member relative to the washer, whereby vertical adjustment of the mounting member relative to the washer adjusts the vertical position of the bracket on the wall.

12. The system of claim 10, wherein the first and second detents comprise serrations.

13. The system of claim 10, wherein the first detents of the mounting member are disposed on a front of the mounting member.

14. The system of claim 10, wherein the washer has an elongate shape.

15. The system of claim 10, wherein the system is free of an additional support bracket for mounting between the mounting member and the wall to adjust the position of the bracket on the wall.

16. A facade support system for attachment to a wall of a structure for supporting a veneer on the wall of the structure, the system comprising:
    a bracket configured for attachment to the wall, the bracket comprising a connecting plate and a mounting member, each of the connecting plate and the mounting member having first detents; and
    a support attached to the connecting plate of the bracket and configured to be disposed in a mortar bed joint of the veneer;
    wherein the first detents of the connecting plate each extend generally vertically and are configured to facilitate adjustment of the horizontal position of the support relative to the wall; and
    wherein the first detents of the mounting member each extend generally horizontally and are configured to facilitate adjustment of the vertical position of the support relative to the wall.

17. The system of claim 16, wherein the first detents each comprise serrations.

18. The system of claim 16, wherein the first detents of the mounting member is disposed on a front of the mounting member.

19. The system of claim 1, wherein the standoff is selectively attachable to the connecting plate to selectively adjust a horizontal distance between the standoff and the support.

20. The system of claim 4, wherein the mounting member includes first detents, the system further comprising a washer attachable to the mounting member for attaching the bracket to the wall, the washer including second detents engageable with the first detents of the first of the mounting member when attached thereto.

21. A facade support system for attachment to a wall of a structure for supporting a veneer on the wall of the structure, the system comprising:
    a bracket configured for attachment to the wall, the bracket comprising a connecting plate and a mounting member;
    a support attached to the connecting plate of the bracket and configured to be disposed in a mortar bed joint of the veneer; and a standoff positioned for engagement with the wall and selectively attachable to the connecting plate in different locations on the standoff to orient the bracket relative to the wall for maintaining a substantially horizontal position of the support
wherein the connecting plate of the bracket has first detents, and the standoff has second detents for adjustably mating with the first detents, adjustment of the connecting plate on the standoff adjusting a horizontal spacing of the connecting plate from the wall.

* * * * *